(12) United States Patent
Frederickson et al.

(10) Patent No.: US 7,567,938 B1
(45) Date of Patent: Jul. 28, 2009

(54) METHOD FOR REIMBURSING ADMINISTRATORS OF PAYMENTS

(75) Inventors: F. Scott Frederickson, New York, NY (US); David LaRusso, Kinnelon, NJ (US)

(73) Assignee: Arch Insurance Group, New York, NY (US)

( * ) Notice: Subject to any disclaimer, the term of this patent is extended or adjusted under 35 U.S.C. 154(b) by 187 days.

(21) Appl. No.: 11/472,933

(22) Filed: Jun. 22, 2006

Related U.S. Application Data

(60) Provisional application No. 60/693,272, filed on Jun. 22, 2005.

(51) Int. Cl.
*G06Q 40/00* (2006.01)
(52) U.S. Cl. ...................................................... 705/39
(58) Field of Classification Search .................... 705/39
See application file for complete search history.

(56) References Cited

U.S. PATENT DOCUMENTS

| | | | |
|---|---|---|---|
| 5,930,759 A | 7/1999 | Moore et al. | |
| 5,950,169 A | 9/1999 | Borghesi et al. | |
| 6,341,265 B1 | 1/2002 | Provost et al. | |
| 6,343,271 B1 | 1/2002 | Peterson et al. | |
| 7,016,856 B1 | 3/2006 | Wiggins | |
| 2002/0035488 A1* | 3/2002 | Aquila et al. | 705/4 |
| 2002/0152097 A1 | 10/2002 | Javors | |
| 2003/0187695 A1 | 10/2003 | Drennan | |
| 2004/0204963 A1* | 10/2004 | Klueh et al. | 705/2 |
| 2004/0231018 A1 | 11/2004 | Olson | |
| 2005/0033604 A1 | 2/2005 | Hogan | |
| 2005/0080692 A1 | 4/2005 | Padam et al. | |
| 2005/0246268 A1 | 11/2005 | Foran et al. | |
| 2006/0106650 A1 | 5/2006 | Bush | |

* cited by examiner

*Primary Examiner*—Kambiz Abdi
*Assistant Examiner*—Jennifer Liversedge
(74) *Attorney, Agent, or Firm*—Edwards Angell Palmer & Dodge LLP; George N. Chaclas

(57) ABSTRACT

A loss ledger system to process third party fund requests on a daily basis, track historical requests, process validation on each request, maintain suspense/escrow and loss ledgers, and provide reconciliation assistance for accounting and claims processing departments. Additionally, the loss ledger system provides management reports, interfaces, security, audit and control and data conversion to facilitate minimizing escrowed resources, fraudulent activity and clerical errors.

15 Claims, 4 Drawing Sheets

Figure 1A

LLS 50 capture tool 52 reconciliation tool 54 administration tool 56

FIG. 3

LLS Accounting Report
From: 5/01/2006  To: 5/31/2006
                 410        412

| | WINS Paid Losses | NON SPLL | Unmatchable | Recoveries | Pending | Reconciled | Rec of Paid Lo |
|---|---|---|---|---|---|---|---|
| | 402 | 404 | 406 | 408 | 410 | 412 | 400 |
| COMPANY A | | | | | | | |
| Acct Category:Non-Specialty, | 0.00 | 0.00 | Division:Programs, 0.00 | SubDivision:Alternative Markets 0.00 | 0.00 | 0.00 | |
| Subtotal Company A | 0.00 | 0.00 | 0.00 | 0.00 | 0.00 | 0.00 | |
| COMPANY B | | | | | | | |
| Acct Category:Non-Specialty, | 2,090,904.20 | 0.00 | Division:Programs, -352,823.91 | SubDivision:Alternative Markets -30,172.97 | 130,273.73 | 2,343,627.35 | 32,84 |
| Subtotal Company B | 2,090,904.20 | 0.00 | -352,823.91 | -30,172.97 | 130,273.73 | 2,343,627.35 | 32,84 |
| COMPANY C | | | | | | | |
| Acct Category:Non-Specialty, | 17,215.00 | 0.00 | Division:Programs, 0.00 | SubDivision:Alternative Markets 0.00 | 0.00 | 17,215.00 | |
| Subtotal Company C | 17,215.00 | 0.00 | 0.00 | 0.00 | 0.00 | 17,215.00 | |
| GRAND TOTAL | 2,108,119.20 | 0.00 | -352,823.91 | -30,172.97 | 130,273.73 | 2,360,842.35 | 32,84 |

METHOD FOR REIMBURSING ADMINISTRATORS OF PAYMENTS

CROSS-REFERENCE TO RELATED APPLICATION

This application claims priority to U.S. Provisional Patent Application No. 60/693,272, filed Jun. 22, 2005, which is incorporated herein by reference in its entirety.

BACKGROUND OF THE INVENTION

1. Field of Invention

The subject technology relates to managing claims payment transactions involving a third party administrator and a method for gathering, processing, disseminating, reconciling and controlling information relating to these payment transactions as utilized by a company such as a property and casualty insurance company.

2. Background of the Related Art

Most insurance companies pay some of their claims by utilizing outside third party adjusting or administration firms (individually, a "TPA" and collectively, "TPAs"). Typically, the insurance companies must give large escrow or suspense deposits to the TPAs, which are used for paying losses. Historically, TPAs make payment requests in one month and then the loss data supporting those payments and any other transactions, such as claims payment set-ups, closings, or reserve changes, are submitted to the insurance company the following month. In response, the insurance companies replenish the escrow accounts. As a result, large sums of capital are poorly deployed by being held in reserve in bank escrow accounts for use by the TPAs.

The insurance companies use the paid loss information supplied by the TPA to adjust their general ledger for paid loss activity. The work to fund the TPAs and record the paid losses is manual and does not allow detailed verification for every payment. Typically, the payment information is summarized and manually scanned, at best, for accuracy. Additionally, with the large escrows that must be maintained, the insurance company may end-up with a large credit exposure in the event of a default by the TPA. Further, a system without accurate tracking allows for clerical errors such as double payment and may tempt an unscrupulous TPA to improperly use or steal a portion of the escrow account. This process only becomes more complicated considering the fact that many large insurance companies use a plurality of TPAs to handle their books of business.

SUMMARY OF THE INVENTION

In light of the problems described with the current method of paying claims through the use of TPAs, there is a need for an improved method of funding the escrow accounts and managing the data associated with this process. The subject technology provides an efficient and accurate method for reducing escrow accounts, verifying payment accuracy of the TPAs and assisting with balancing the ledger of said payments.

An embodiment of the subject invention enables the insurance company to reduce its loss fund escrow balances with TPAs to a fraction of what was necessary previously in the manual loss funding method. Preferably, the TPAs are funded on a daily basis as opposed to a monthly basis or longer time frame. The insurance company is also able to obtain real-time loss related data (i.e., claim, policy and check payment detail), which enables the insurance company to verify the accuracy of the payment request immediately. Also, the insurance company is able to create a paid loss database from which it is able to quickly and accurately input data into its general ledger in the months following the payments.

In addition to the return of escrow funds, which can then be used for investment or other purposes, the insurance company is able to handle large volumes of loss payment activity from multiple TPAs on a daily basis and quickly assess the accuracy of the funding requests. The subject technology has the ability to determine if a request includes payments previously made or if the request is invalid for any number of other reasons. The TPA is immediately notified of the error and is asked to resubmit the request without the errors. The process also enables the TPAs to always have sufficient funds on-hand with a quick turnaround of their funding requests. Preferably, large loss requests for such things as settlements are also handled and tracked on one of the many reports available to determine if the funds issued to the TPA were being withheld by the TPA for an unreasonable period of time, or if the TPA issued a check to a claimant that was still not cashed or deposited by the claimant.

Where the insurance company is part of a holding company system that has other subsidiary insurance companies, a preferred embodiment also allows such holding company system to identify the particular company that the payment is being made from through information contained in a daily request file received from the TPAs. While a TPA may be able to convey information relating to which particular company is being charged for a loss payment, it is a difficult and time consuming process where multiple companies are involved. The subject technology described herein enables each company to glean that information through the policy information supplied by the TPAs along with the other payment information detail.

Preferably, the subject technology allows for reconciliation between what the TPA requested in one month and what the TPA reported to the insurance company the following month. By analyzing the details of each payment transaction and quickly responding to the TPAs with any necessary changes, payment errors are greatly reduced, the recording of paid losses is more accurate and the opportunity for misappropriation is reduced. In a further aspect, the subject technology facilitates entering the paid loss data into the insurance company's general ledger system, and includes a number of reports that can be used for the reconciliation process, as well as for reporting in great detail the paid loss history of the insurance company in so far as the TPA claim activity is concerned.

In one embodiment, the subject technology is directed to a system for facilitating processing TPA fund requests on a periodic basis. The system communicates with TPAs and banks via a network. The system includes a memory component which stores an instruction set and data related to a plurality of policyholders and a processor for running the instruction set, the processor being in communication with the memory and the network. The processor is operative to maintain an escrow account at a first bank for use by a TPA, receive a plurality of TPA fund requests for amounts related to a plurality of payees from the TPA, approve the TPA fund requests based upon criteria, provide instructions to a second bank to transfer funds to the escrow account based on approval of the TPA fund requests and monitor payment and clearance of the amounts from the escrow account.

In another aspect, the subject technology is directed to a method for implementing an escrow account for a TPA in a network. The method includes the steps of establishing an escrow account at a bank, wherein the bank is in communication with the network, receiving a funding request from a TPA, the fund request being an electronic data file including a claim number, an amount, a check number and a check date, approving the fund request based upon the claim number, the amount, the check number and the check date, providing funds to the escrow account equal to the amount and monitoring clearance of the funds from the escrow account.

In a further aspect, the company is a subsidiary of a holding company having a plurality of subsidiaries utilizing the same loss ledger system.

It should be appreciated that the present invention can be implemented and utilized in numerous ways, including without limitation as a process, an apparatus a system, a device, a method for applications now known and later developed and a computer readable medium. These and other unique features of the system disclosed herein will become more readily apparent from the following description and the accompanying drawings.

BRIEF DESCRIPTION OF THE DRAWINGS

In order that those having ordinary skill in the art to which the disclosed system appertains will more readily understand how to make and use the same, reference may be had to the drawings wherein:

FIG. 1A is a somewhat schematic version of a system used by the company during the implementation of the subject technology;

FIG. 3 is a table showing summary processing of escrow accounts for three companies in accordance with the subject technology.

DETAILED DESCRIPTION OF PREFERRED EMBODIMENTS

The present invention overcomes many of the prior art problems associated with reconciling ledger accounts administrated by TPAs. The advantages, and other features of the system disclosed herein, will become more readily apparent to those having ordinary skill in the art from the following detailed description of certain preferred embodiments taken in conjunction with the drawings which set forth representative embodiments of the present invention.

Figure 1:
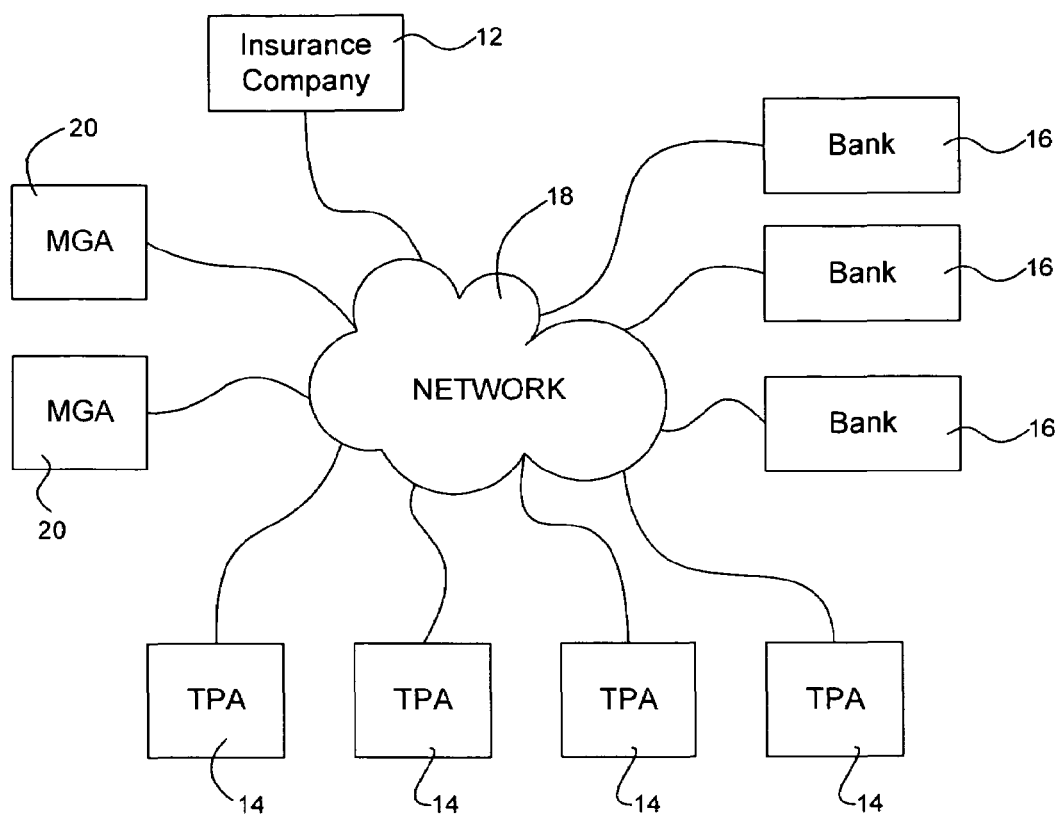
FIG. 1 is an overview of a network environment in which a loss ledger system in accordance with the subject technology may be implemented.

Referring now to FIG. 1, there is shown a block diagram of an environment 10 with a loss ledger system embodying and implementing the methodology of the present disclosure. The environment 10 interconnects a company 12 with a plurality of TPAs 14, banks 16, managing general agencies/brokers (individually, an "MGA" or collectively, "MGAs") 20 and the like via a network 18. In one embodiment, the company 12 is an insurance company that uses TPAs to make payments to qualified subscribers. The company 12 and TPAs 14 work with MGAs 20, where the MGAs 20 serve as the retail side of the insurance industry. In brief overview, the subject technology matches funding request details submitted by TPAs 14 with data compiled by the company 12 and banks 16. Although the subject technology is particularly suited to such an application, health care providers and many other industries can benefit from the technology disclosed herein. The following discussion describes the structure of such an environment 10, but further discussion of the application programs and databases that embody the methodology of the present invention is described elsewhere herein.

Each component 12, 14, 16, 18, 20 of the environment 10 includes one or more servers (not shown) which communicates with the network 18 via communication channels, whether wired or wireless, as is well known to those of ordinary skill in the pertinent art. In one preferred embodiment, the network 18 is the Internet. The servers host multiple Web sites and houses multiple databases necessary for the proper operation of the loss ledger system (LLS) 50 (see FIG. 1A) in accordance with the subject invention. The servers are any of a number of servers known to those skilled in the art that are intended to be connected to or part of a network so as to link clients or end user computers at the entities 12, 14, 16, 20 via the network 18.

The network 18 may include any number of network systems well known to those skilled in the art. For example, distributed computer network 18 may be a combination of local area networks (LAN), wide area networks (WAN) as is well known. For the Internet, the preferred method of accessing information is the World Wide Web because navigation is intuitive and does not require technical knowledge.

It is envisioned that the environment 10 includes a plurality of computers or clients (not shown) such as desktop computers, laptop computers, personal digital assistants, cellular telephones and the like. The clients allow users to interact with the servers to access information and conduct transactions within the environment 10. For simplicity, the components 12, 14, 16, 18 are shown without servers and/or client computers, but it is understood that each would have a plurality of such devices that would be interchangeable such that a plurality of users can utilize the environment 10 simultaneously. Although a simplified environment 10 is illustrated in FIG. 1, such illustration shall not be construed as limiting the present invention to the illustrated embodiment.

Referring now to FIG. 1A, there is shown a somewhat schematic version of a LLS 50 used by the company 12. In one embodiment, the LLS 50 is embodied in a server operated by the company 12. The LLS 50 is equipped to interact with the network 18 and/or with components 14, 16, 20 directly as is well-known to those of ordinary skill in the pertinent art. The LLS 50 includes several functional modules that allow implementation of the subject technology. A capture tool 52 of the LLS 50 serves to send and receive, format and compile data files from a plurality of sources. A reconciliation tool 54 of the LLS 50 serves to analyze the databases created by the capture tool 52. An administration tool 56 of the LLS 50 serves to coordinate the processing of the capture tool 52 and reconciliation tool 54 as well as generate reports for the company 12.

The LLS 50 also provides for security maintenance. Therefore, although each user (e.g., the employees of the company 12, TPAs 14, and banks 16) have access thereto, each group's access is controlled. The LLS 50 specifies which aspects of the program can be accessed/utilized, and at what level in order to maintain an appropriate, secure electronic ledger.

Figure 2:
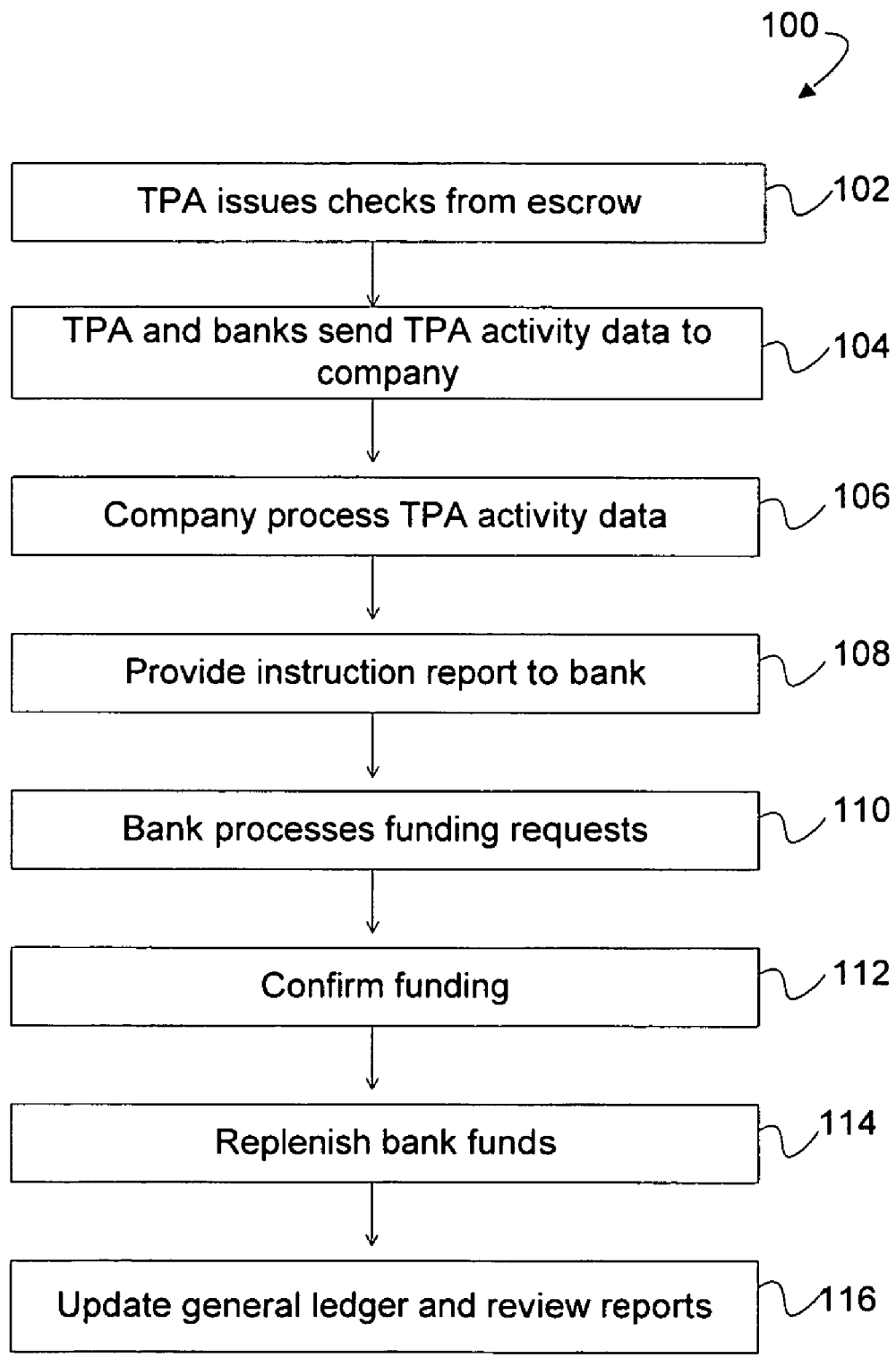
FIG. 2 is a schematic flowchart for a front-end process in accordance with the subject technology.

Referring now to FIG. 2, there is shown a schematic flowchart for a front-end process 100 in accordance with the subject technology. The following description is with respect to a single TPA 14, TPA bank 16 and MGA 20 for simplicity, although it is to be appreciated that the process 100 is occurring with a plurality of each simultaneously for the same company 12. Initially, a TPA 14 is engaged by the company 12 to administrate payment to policyholders. Typically, the MGA 20 will have written the policy and be involved in the claim approval process. The company 12 establishes an escrow account associated with the TPA 14. The escrow account is with a bank 16 and, particularly, a TPA bank 16 associated with the TPA 14. At step 102, as qualified claimants request payment on their policies, the TPA 14 issues checks from the escrow account. As a result, the TPA 14 provides the check to the qualified claimants. Upon cashing the check, the funds are removed from the TPA escrow account at the TPA bank 16.

At step 104, the TPA 14 collects the check clearance information from the TPA bank 16, the issued check information and like information related to the escrow account for submission to the company 12. For example, in the insurance industry, each check cashed and cleared from the escrow account plus each outstanding check is required in order to make sure that sufficient funds will be present to cover any and all obligations. Typically, each check is also associated with a policy number to identify the claimant. Preferably, these TPA activity files are created daily by the TPA 14 and TPA bank 16 and sent to the company 12 via FTP across the network 18.

Not only do the TPA 14 and TPA bank 16 summarize the activity related to the TPA escrow account for the capture tool 52 but the company bank 16 used to fund the TPA escrow account also generates an activity report for the capture tool 52. As necessary, the TPA 14 also provides policy data to the company 12 and TPA 14. This TPA activity data includes information such as claim updates, rejected transactions and the like. Preferably, the TPA activity data is formatted in a standard manner for entry without conversion by the capture tool 52.

At step 106, the capture tool 52 of the company 12 feeds the TPA activity data into a database containing similar information from all the TPAs 14. The records associated with each TPA 14 also are grouped to form a transaction history for each TPA 14. The reconciliation tool 54 of the LLS 50 uses the coordinating data from the TPA bank 16, company bank 16 and MGA 20 regarding the claims administration for cross-checking the data of the TPA 14. As a result, if a Fund Request (FR) includes an error, whether it be for a second payment request on the same claim or of a clerical nature, the FR is immediately flagged and rejected, and the TPA 14 is notified by the company to take corrective action and resubmit such payment request. As can be seen, the LLS 50 applies rules to each FR and, in turn, prevents incorrect data entry.

Once the TPA, MGA, TPA bank and company bank activity data are compiled by the capture tool 52, the reconciliation tool 54 and administration tool 56 of the company 12 further process the data. For example, the reconciliation tool 54 generates a daily summary of FRs for each TPA escrow account. The reconciliation tool 54 attempts to match each FR or detail of every TPA escrow account. FRs that are matched or pre-approved proceed to be processed for payment. Unmatched FRs are not funded, and further investigation and reconciliation occurs.

At step 108, in order to meet the matched FRs, the administration tool 56 provides a proper instruction report to the appropriate bank 16, (e.g., the company bank 16). Preferably, this bank instruction report is uploaded daily by the company bank 16 over a secure connection and/or protected by encryption technology.

The administration tool 56 also generates reports related to the activity of the capture tool 52 and reconciliation tool 54 for review by the company 12. For example, the reports include data related to current escrow balance and daily, weekly and monthly cash flow, outstanding liabilities related to checks yet to clear, yet to be filled FRs and the like. Further, the administration tool 56 also generates reports, which summarize and highlight any discrepancies such as improper payments or TPA fund requests with no corresponding entry from a-TPA.

At step 110, the company bank 16 processes the FRs of the instruction report. Preferably, the company 12 coordinates release of the FRs through a portal to the company bank 16. The processing includes the company bank 16 completing automated clearinghouse ("ACH") transactions for each escrow account requiring funds for each TPA 14.

At step 112, the reconciliation tool 54 monitors the progress of the transactions to confirm funding of the escrow accounts. Upon completion of uploading the daily instruction reports to the bank and notifying the company treasury department, the reconciliation tool 54 updates the status of the transactions to "approved." The reconciliation tool 54 further confirms that the approved transactions result in the funds being sent to the respective TPA bank 16. As noted above, records of each of these activities are provided to the company 12 for verification checking.

At step 114, the company 12 then wire transfers to the company bank 16 funds to reimburse the day's ACH transactions to the TPA banks 16. Upon reimbursement, the reconciliation tool 54 updates the general ledger of the company 12 related to losses paid to TPAs 14 at step 116. Preferably, the general ledger is updated to reflect all current activity on a daily basis. The general ledger is reconciled to insure that all payments made to the TPAs 14 are proper. For example, if the check number, amount, date and claim number each match the expected data, then the transaction is considered matched. If any of these four criteria have a discrepancy, then the transaction is considered unmatched.

By keeping track of the daily obligations paid, outstanding, and upcoming, the administration tool 56 generates reports that allow minimizing the amount of funds that must be dedicated to the TPA escrow accounts. Further, unmatched transaction and other irregularities such as improper payment, untimely payment, excessive fund requests without supporting policies/claims and the like are identified for subsequent investigation.

As can be seen, the timeliness and accuracy of processing claims allows the escrow amounts to be significantly reduced. The detailed and accessible trail of the activity allows tracking and auditing. For example, time periods regarding delays in cashing checks, or providing checks to claimants, can be tracked in "aged" reports. As a result, outstanding liabilities and performance can be tracked to efficiently utilize resources and improve efficiency.

In a preferred embodiment, a TPA 14 can submit a pre-fund request ("PFR") for significant expected losses to make sure the escrow account is adequately funded. As a general rule, the LLS 50 requires a PFR for all transactions above a user-selected threshold. In one embodiment, the user-selected threshold is $25,000 to trigger the need for a PFR. Upon approval by the company 12, the TPA bank 16 is wired the appropriate amount for addition to the TPA escrow. Upon payment of the loss, a check is issued and clearance of the check from the escrow account is tracked by the LLS 50. The capture tool 52 enters the PFR into the ledger database. The reconciliation tool 56 identifies and treats each PFR differently in order to avoid double payment.

In one embodiment, the administration tool 56 of the LLS 50 generates a convergence report that compares the amount funded into escrow for a TPA 14 versus the corresponding ACH for the TPA bank 16. Over time, these two amounts should converge, hence the name convergence report. If there is an excess in the escrow funding, it is an indication of possible loss payments being made outside the LLS 50. If there is excess in the bank ACH, it is an indication of possible payment to a TPA 14 without claimants being paid and the like. The LLS 50 would also provide the details of the discrepancies, i.e., specific transaction details of the unmatched amounts for further investigation.

As would be apparent to those of ordinary skill in the pertinent art upon review of the subject disclosure, such information as shown in the convergence report could then be used to evaluate the circumstances. If a high-level authorized user reviews the data, such a user can, on a periodic basis, qualify the discrepancies as not needing further investigation until the next report. The LLS 50 is also envisioned to accept data from systems internal to the company 12 such as a claims processing unit. By cross-referencing each transaction to a policy number, a history can also be generated on a claimant by claimant basis. It is also envisioned that summary reports can be generated that only indicate unmatched transactions and discrepancies for review and/or investigation. The LLS 50 preferably also generates reports related to each TPA 14 and respective bank 16.

Referring now to FIG. 3, table 400 shows exemplary data for three companies (e.g., Company A, B and C). Each column represents a different total for each company. For example, the first column 402 provides a total of losses paid to claimants according to a claims database of the insurance company 12. The second column 404 shows the total of money paid outside the LLS 50. The third column 406 shows the total money unmatched by the LLS 50. As noted above, further breakdown to the transactional level is possible for the totals of any column. The fourth column 408 shows recoveries and the fifth column 410 reflects pending transactions. The sixth column 412 shows a total of funds reconciled by the LLS 50.

In another embodiment, the company 12 is part of a holding company system that has other subsidiary companies, each of which conducts similar business. The LLS 50 allows the holding company to identify the particular company 12 that the payment is being made from through information contained in a daily request file received from the TPAs 14. The LLS 50 parses the company specific information through the policy information supplied by the TPAs 14 along with the other payment information detail. As a result, company by company data and reports are generated even though the starting data from the TPAs 14 includes data related to a plurality of the subsidiaries or companies 12.

The flow charts herein illustrate the structure or the logic of the present invention as embodied in computer program software for execution on a computer, digital processor or microprocessor. Those skilled in the art will appreciate that the flow charts illustrate the structures of the computer program code elements, including logic circuits on an integrated circuit, that function according to the present technology. As such, the present technology is practiced in its essential embodiments by a machine component that renders the program code elements in a form that instructs a digital processing apparatus such as a computer to perform a sequence of function steps corresponding to those shown in the flow diagrams.

It will be appreciated by those of ordinary skill in the pertinent art that the functions of several elements may, in alternative embodiments, be carried out by fewer elements, or a single element. Similarly, in some embodiments, any functional element may perform fewer, or different, operations than those described with respect to the illustrated embodiment. Also, functional elements (e.g., modules, tools, databases, interfaces, computers, servers and the like) described as distinct for purposes of illustration may be incorporated within other functional elements in a particular implementation.

While the invention has been described with respect to preferred embodiments, those skilled in the art will readily appreciate that various changes and/or modifications may be made to the invention without departing from the spirit or scope of the invention as defined by the appended claims.

What is claimed is:

1. An insurance loss ledger management system, wherein the insurance loss ledger management system communicates with third party administrators (TPAs) and banks via a network, and wherein the system comprises:
   (a) a memory storing an instruction set and data related to a plurality of insurance policy holders; and
   (b) a processor for running the instruction set, the processor being in communication with the memory and the network, wherein the processor is operative to facilitate processing insurance third party administrator (TPA) fund requests by an insurance carrier on a periodic basis by:
      (i) maintaining an escrow account with a balance at a first bank to provide payments to an insurance TPA;
      (ii) receiving a plurality of insurance TPA fund requests from the insurance TPA, each insurance TPA fund request being for a daily total related to a plurality of payees based on insurance policies between the plurality of insurance policy holders and the insurance carrier;
      (iii) approving the insurance TPA fund requests based upon certain criteria, wherein the criteria is data associated with a claim payment check issued by the insurance TPA, wherein the data includes a check number, amount, date and claim number;
      (iv) providing daily instructions to a second bank to transfer funds to the escrow account to minimize the balance based on approval of the insurance TPA fund requests, the funds being equal to the approved insurance TPA fund request total and transferred daily; and
      (v) monitoring payment and clearance of the amounts associated with the approved insurance TPA fund requests from the escrow account to insure the balance is sufficient.

2. An insurance loss ledger management system as recited in claim 1, wherein the processor is further operative to track historical activity related to the insurance TPA.

3. An insurance loss ledger management system as recited in claim 1, wherein the processor is further operative to maintain an escrow account balance and loss ledger in real-time.

4. An insurance loss ledger management system as recited in claim 3, wherein the processor is further operative to note approval of the insurance TPA fund request to prevent a second fund transfer for the insurance TPA fund request.

5. An insurance loss ledger management system as recited in claim 3, wherein the processor is further operative to note transfer of funds for the insurance TPA fund request to prevent a second fund transfer for the insurance TPA fund request.

6. An insurance loss ledger management system as recited in claim 1, wherein the processor is further operative to conduct pre-fund requests for anticipated insurance TPA fund requests above a certain threshold.

7. An insurance loss ledger management system as recited in claim 1, wherein the processor is further operative to reconcile reports from the insurance TPA, the first bank and the second bank.

8. An insurance loss ledger management system as recited in claim 7, wherein the processor is further operative to reject one of the insurance TPA fund requests upon the criteria that a fund request for a certain related claim having already been approved and funded.

9. A method for implementing a loss ledger for an insurance carrier in a network in communication with banks, third party administrators (TPAs), and the insurance carrier, the method comprising the steps of:
   (a) establishing an escrow account at a bank for use by the insurance carrier and an insurance third party administrator (TPA), wherein a bank client computer of the bank is in communication with a carrier server computer of the insurance carrier via the network;
   (b) receiving a funding request at the carrier server from an insurance client computer of the insurance TPA via the network, the fund request being an electronic data file including a claim number, an amount, a check number and a check date;
   (c) approving the fund request by the carrier server based upon the claim number, the amount, the check number and the check date;
   (d) providing funds to the bank for the escrow account equal to the amount; and
   (e) monitoring clearance of the funds from the escrow account by the carrier server such that a second fund request for the same claim number, amount, check number or date is rejected, wherein the monitoring step includes daily tracking of a total of outstanding payments to be made from the escrow account so that a balance of the escrow account is minimized.

10. An insurance loss ledger management system, wherein the insurance loss ledger management system communicates with third party administrators (TPAs) and banks via a network, and wherein the system comprises
   (a) a memory storing an instruction set and data related to a plurality of insurance policy holders; and
   (b) a processor for running the instruction set, the processor being in communication with the memory and the network, wherein the processor is operative to facilitate processing insurance third party administrator (TPA) fund requests by an insurance carrier on a periodic basis by:
      (i) maintaining an escrow account with a balance at a first bank to provide payments to an insurance TPA;
      (ii) receiving a plurality of insurance TPA fund requests from the insurance TPA, each insurance TPA fund request being for a daily total related to a plurality of payees based on insurance policies between the plurality of insurance policy holders and the insurance carrier;
      (iii) approving the insurance TPA fund requests based upon certain criteria, wherein the criteria is data associated with a claim payment check issued by the insurance TPA, wherein the data includes a check number, amount, date and claim number;
      (iv) providing daily instructions to a second bank to transfer funds to the escrow account to minimize the balance based on approval of the insurance TPA fund requests, the funds being equal to the approved insurance TPA fund request total and transferred daily;
      (v) monitoring payment and clearance of the amounts associated with the approved insurance TPA fund requests from the escrow account to insure the balance is sufficient; and
      (vi) rejecting one of the insurance TPA fund requests upon the criteria that a fund request represents a certain related insurance TPA fund request that has already been approved and funded.

11. An insurance loss ledger management system as recited in claim 10, wherein the processor is further operative to reconcile reports from the insurance TPA, the first bank and the second bank.

12. An insurance loss ledger management system as recited in claim 10, wherein the processor is further operative to track historical activity related to the insurance TPA.

13. An insurance loss ledger management system as recited in claim 10, wherein the processor is further operative to maintain an escrow account balance and loss ledger related to same in substantially real-time.

14. An insurance loss ledger management system as recited in claim 13, wherein the processor is further operative to note approval of the insurance TPA fund request to prevent a second fund transfer for the insurance TPA fund request.

15. An insurance loss ledger management system as recited in claim 13, wherein the processor is further operative to note transfer of funds for the insurance TPA fund request to prevent a second fund transfer for the insurance TPA fund request.

\* \* \* \* \*